United States Patent [19]

Barber

[11] Patent Number: 4,864,333

[45] Date of Patent: Sep. 5, 1989

[54] CAMERA AND FACADE

[76] Inventor: Glen M. Barber, Apt. 5-A Horne Ave., Winsted, Conn. 06098

[21] Appl. No.: 255,945

[22] Filed: Oct. 11, 1988

[51] Int. Cl.$^4$ .............................................. G03B 29/00
[52] U.S. Cl. ...................................... 354/76; 354/295; 446/72; 446/339; D16/237
[58] Field of Search ................. 354/266, 290, 295, 76, 354/75; D16/219, 237; D21/190; 446/72, 268, 339

[56] References Cited

U.S. PATENT DOCUMENTS

| | | | |
|---|---|---|---|
| 266,035 | 10/1882 | Higgins | 354/75 |
| 4,072,973 | 2/1978 | Mayo | 354/295 |
| 4,736,220 | 4/1988 | Heinzelmann | 354/295 |

Primary Examiner—A. A. Mathews

[57] ABSTRACT

A camera and removable facade is set forth wherein the facade is in the configuration of a human face to provide a first eye formed with a conical interior to securely seat a camera lens therewithin. A plurality of overlying Velcro TM straps secure an associated camera in firm orientation with the first eye and facade. A second eye is in the form of a parabolic lash that is secured through a plurality of linkages and biased to an open position whereupon depressing of the associated linkages associated with the shutter button of the camera, the second eye will effect a winking motion to indicate completion of the picture and maintain interest of a subject to be photographed, typically a child.

8 Claims, 1 Drawing Sheet

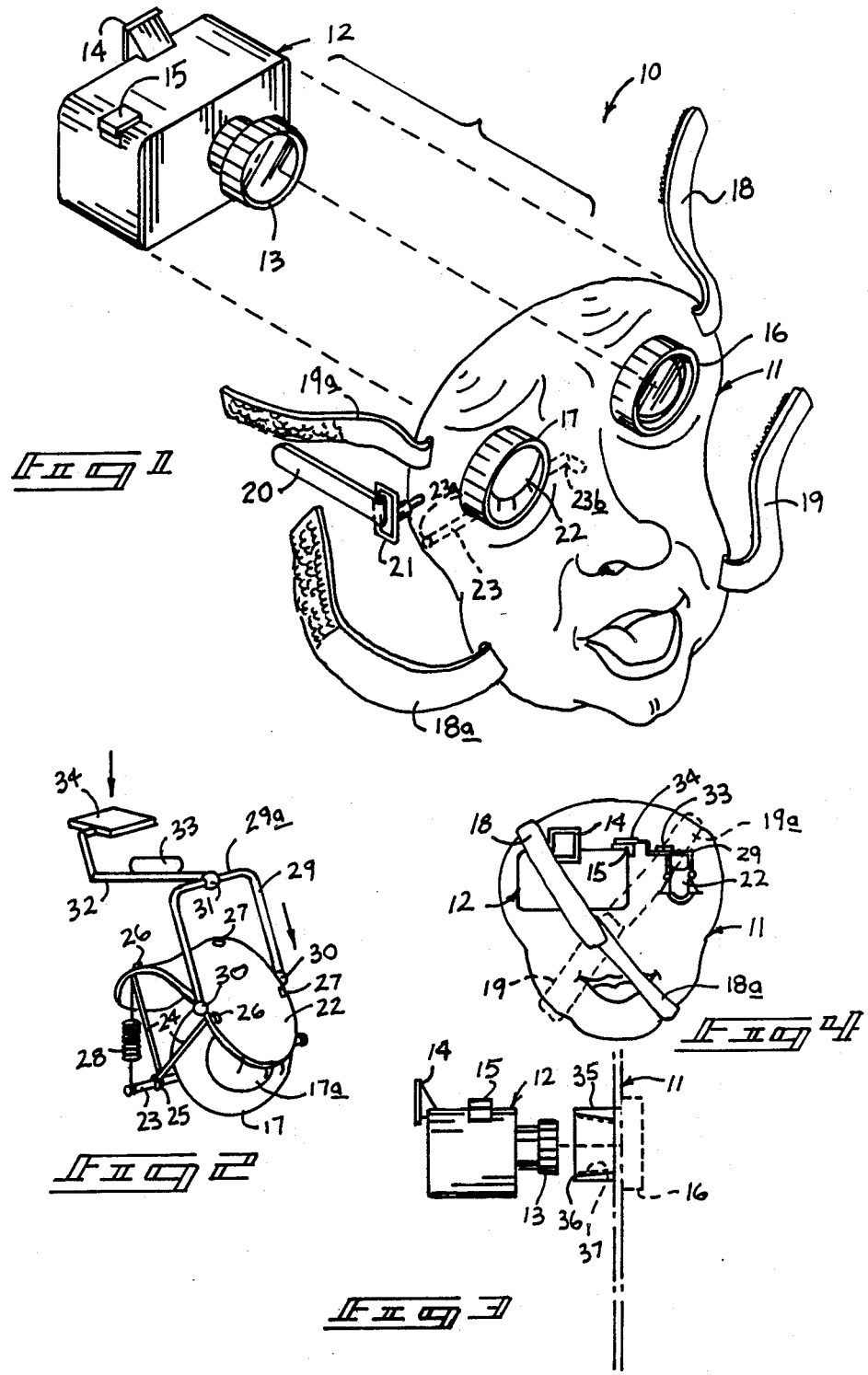

CAMERA AND FACADE

BACKGROUND OF THE INVENTION

1. Field of the Invention

The field of invention relates to photographic equipment, and more particularly pertains to a new and improved camera and facade that maintains and amuses a subject to be photographed during the photographing event.

2. Description of the Prior Art

The use of decorative devices in conjunction with cameras and the like to maintain interest and attention of a subject to be photographed is well known in the prior art. Typically such subjects are children whose attention span is greatly diminished to that of an adult and accordingly, it is desirable to utilize various apparatus to attempt to maintain the interest of such a photographic subject. Devices of the past, however, have been of a relatively complex and elaborate construction with associated elevated production costs of such equipment. Conversely such devices have been of a non-mechanical interrelationship in association with a camera that fail to provide an element of animation to assist in maintaining interest of a child to be photographed.

An example of the prior art camera of this class of invention may be found in U.S. Pat. No. 4,072,973 to Mayo wherein a camera is electronically associated with a signaling device positioned on a portion of the camera which indicates a "funny face" which appears when lighted from behind. The face is not animated in any sense, but the signal is provided in terms of an audible sound associated with the lighting of the face. The device is of interest relative to the instant invention, but is of a limited organization and does not hide the camera as does the instant invention and thereby may be of less effect in use when photographing children as the object of the camera is apparent.

U.S. Des. Pat. No. 88,116, and U.S. Des. Pat. No. 270,839 are both illustrative of an ornamental camera case configuration to assist in masking the associated camera. The patents are of interest relative to the use of facades associated with cameras, but fail to provide an operative animated effect to maintain interest of a child during a photographic session.

U.S. Pat. Nos. 149,093 and 222,627 to Seymour and Cohn respectively are illustrative of configurations in conjunction with various articles, such as a coin bank and the like, for ostensibly maintaining interest of a child in association with the article.

As such, it may be appreciated that there is a continuing need for a new and improved camera and facade that is both effective in operation and animated in use for maintaining interest of a subject child during a photographic session, and in this respect the present invention substantially fulfills this need.

SUMMARY OF THE INVENTION

In view of the foregoing disadvantages inherent in the known types of camera facades now present in the prior art, the present invention provides a camera and facade wherein the same are readily securable together and operative to effect a winking action of one of a plurality of eyes through extending within the facade. As such, the general purpose of the present invention, which will be described subsequently in greater detail, is to provide a new and improved camera facade which has all the advantages of the prior art camera facade and none of the disadvantages.

To attain this, the present invention comprises a facade or mask of a human visage with two through-extending eyes. One of the eyes is formed with a conical rearwardly extending tubular-like member to frictionally engage a camera therewithin. The interior of the cone is provided with a resilient friction material to anchor and secure the camera in position. A plurality of Velcro (TM) strap pairs are utilized to fasten the facade to the camera. An adjacent linkage system is associated with the adjacent eye to effect a winking action of the eye indicating completion of the photographic event and maintain the attention of a subject to be photographed.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, not is it intended to be limiting as to the scope of the invention in any way.

It is therefore an object of the present invention to provide a new and improved camera facade which has all the advantages of the prior art camera facades and none of the disadvantages.

It is another object of the present invention to provide a new and improved camera facade which may be easily and efficiently manufactured and marketed.

It is a further object of the present invention to provide a new and improved camera facade which is of a durable and reliable construction.

An even further object of the present invention is to provide a new and improved camera facade which is susceptible of a low cost of manufacture with regard to both materials and labor, and which accordingly is then susceptible of low prices of sale to the consuming public, thereby making such camera facades economically available to the buying public.

Still yet another object of the present invention is to provide a new and improved camera facade which provides in the apparatuses and methods of the prior art some of the advantages thereof, while simultaneously overcoming some of the disadvantages normally associated therewith.

Still another object of the present invention is to provide a new and improved camera and facade wherein a mask, typically of a human visage, is securedly fixed over a camera and effects a winking action upon completion of the photographic event.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the camera and facade in an exploded view.

FIG. 2 is an isometric illustration of the winking mechanism associated with the instant invention.

FIG. 3 is an orthographic view illustrating in cross-section the first eye provided with a conically rearwardly projecting form member to securely accept the camera therewithin.

FIG. 4 is a rear orthographic view taken in elevation of the instant invention in an assembled configuration.

DESCRIPTION OF THE PREFERRED EMBODIMENT

With reference now to the drawings, and in particular to FIGS. 1 to 4 thereof, a new and improved camera and facade embodying the principles and concepts of the present invention and generally designated by the reference numeral 10 will be described.

More specifically, it will be noted that camera and facade apparatus 10 essentially comprises a facade 11 of a human face configuration and an associated camera 12. The camera 12 is formed with a conventional lens 13, a view finder 14, and a shutter switch 15.

The facade 11 includes a first eye 16 for receiving the lens 13 of the camera and a second eye 17 to effect a winking function, to be described in more detail below. To this end, the second eye 17 includes a pupil 17a, as illustrated in FIG. 2, underlying the winking lid 22. The facade 11 further includes a first and second securement strap 18 and 18a respectively to diagonally secure the camera about the rear thereof, with a third and fourth securement strap 19 and 19a respectively to secure the camera, as illustrated in FIGS. 1 and 4. The securement straps are provided with hook and loop fasteners to accommodate slight variations in camera manufacture and maintain an adjustable securement of the camera body and lens in contiguous alignment with the rear face of the facade 11.

For convenience, a carrying strap 20 connected to a swivel connector 21 is secured to the facade to enable convenient transport and portage thereof.

Reference to FIG. 2 provides a more detailed illustration of the winking lid 22 which is formed of a parabolic longitudinal configuration to pivotally overlie the pupil 17a in an extended position and to retract to a first position by means of a return spring 28.

An axle 23 is secured to the facade 11 at a first and second pivot connecting point 23a and 23b respectively, as illustrated in FIG. 1. A plurality of braces including a first brace pair 24 and a second brace pair (not illustrated) are secured in a "V" shaped orientation including a pivotal apex 25 secured about the axle 23 and joined to the parabolic eye lid 22 at first and second lid connecting points 26 and 27 respectively, as illustrated in FIG. 2.

A "U" shaped brace 29 provided with a horizontal leg and a plurality of orthogonally and downwardly directed parallel legs are secured to the eye lid by means of pivot connectors 30 mounted at either side of the lid 22 forwardly of the axle 23. The horizontal leg 29a is slidably directed through a ball connector 31 medially of the horizontal leg 29a and the ball connector formed with a through-extending bore accepts the horizontal leg 29a slidingly therethrough. The ball connector 31 is integrally secured to an angulated link 32 formed with an integrally positioned pressure pad 33 to accept downwardly directed force applied thereto by a user of the apparatus. Downward force applied and directed onto the pressure pad 33 and integral connection to a camera pad 34, forces the simultaneous downward positioning of the camera pad 34 to actuate the shutter switch 15 of the camera and simultaneously force the "U" shaped brace 29a downwardly to effect a winking of the second eye 17.

Attention to FIG. 3 will illustrate the association of the first eye 16 and the camera 12 wherein the first eye 16 is formed with a rearwardly directed cylinder 35. The cylinder 35 is formed with a conical interior 36 provided with a friction coating 37 thereon to maintain and secure the camera in alignment with the first eye 16.

As to the manner of usage and operation of the instant invention therefore, the same should be apparent from the above description and accordingly no further discussion relative to the manner of usage and operation shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A camera and facade for photographic exposure of animate subjects comprising,
   a camera including a lens, a shutter switch, and a view finder; and
   said camera lens removably securable rearwardly to a rear surface of a facade, said facade including a first and second forwardly directed eye, and said first eye accepting said camera lens within a rearwardly directed cylinder projecting rearwardly of said facade, and said second eye including a pivotally mounted lid mounted for actuation simultaneously with actuation of said shutter switch to photograph said subject.

2. A camera and facade as set forth in claim 1 wherein said facade includes a plurality of strap pairs for securement of said camera to said facade, and said strap pairs including hook and loop fasteners thereon for adjustable positioning of said strap pairs about said camera.

3. A camera and facade as set forth in claim 2 wherein said rearwardly directed cylinder further includes a conical interior and wherein said conical interior has formed thereon a friction coating for a non-slip positioning of said camera lens within said cylinder.

4. A camera and facade as set forth in claim 3 wherein said pivotally mounted lid further includes a plurality of braces, said braces secured to said lid at upper terminal ends and pivotally mounted to an axle, and said axle secured to said facade at first and second connections formed at terminal ends of said axle.

5. A camera and facade as set forth in claim 4 wherein said lid is of parabolic configuration and is formed with a return spring, said return spring secured to said lid at one end of said spring and secured to said axle on said other end of said spring at a rear portion of said lid.

6. A camera and facade as set forth in claim 5 further including a "U" shaped brace secured to a forward portion of said lid wherein a plurality of legs depend downwardly and are secured to opposed sides of said lid by pivotal connections.

7. A camera and facade as set forth in claim 6 wherein said "U" shaped brace includes horizontal legs integrally formed to said downwardly directed legs and is provided with a socket connection medially thereof, said socket connection is formed with through-extending bore, and said socket connection integrally secured to an angulated link formed with a pressure pad medially thereof.

8. A camera and facade as set forth in claim 7 wherein said angulated link is formed with a camera pad at a terminal end thereof remote from said "U" shaped leg for actuation of said shutter switch of said camera upon downwardly directed force being applied to said pressure pad.

* * * * *